United States Patent [19]

van Wijhe et al.

[11] 4,342,934
[45] Aug. 3, 1982

[54] PREFABRICATED BRUSH HOLDER ASSEMBLY FOR USE IN SMALL ELECTRIC MOTORS

[75] Inventors: Albert van Wijhe, Bühlertal; Ernst Münster, Bühl; Gerhard Wagenbrenner, Rastatt; Fritz Röcker; Joachim Armbruster, both of Bühlertal; Klaus Metzger, Ottersweier; Rüdiger Ratzel, Bühl, all of Fed. Rep. of Germany

[73] Assignee: Robert Bosch GmbH, Stuttgart, Fed. Rep. of Germany

[21] Appl. No.: 138,575

[22] Filed: Apr. 8, 1980

[30] Foreign Application Priority Data

Apr. 12, 1979 [DE] Fed. Rep. of Germany ....... 2914853

[51] Int. Cl.³ .......................................... H02K 13/00
[52] U.S. Cl. .................................. 310/239; 310/68 R; 310/71; 310/72; 307/105
[58] Field of Search ...................... 336/68 R, 68 C, 72, 336/239, 233, 240, 241, 242, 245, 246, 247, 42, 51, 71; 307/105; 323/12, 17 L, 172, 202

[56] References Cited

U.S. PATENT DOCUMENTS

| 2,143,920 | 1/1939 | Lee | 307/105 |
| 2,219,121 | 10/1940 | Thunberg | 307/105 |
| 2,242,333 | 5/1941 | Thunberg | 307/105 |
| 2,334,722 | 11/1943 | Mirick | 310/68 R |
| 2,450,809 | 10/1948 | Nader | 310/239 |
| 3,003,074 | 10/1961 | Finsterwalder | 310/239 |
| 3,159,763 | 12/1964 | Colvill | 310/239 |

FOREIGN PATENT DOCUMENTS

| 2701161 | 7/1978 | Fed. Rep. of Germany | 310/239 |
| 997131 | 7/1965 | United Kingdom | 310/68 R |
| 1235943 | 6/1971 | United Kingdom | 310/68 R |
| 1253197 | 11/1971 | United Kingdom | 310/68 R |
| 1333787 | 10/1973 | United Kingdom | 310/68 R |
| 1402591 | 8/1975 | United Kingdom | 310/71 |

*Primary Examiner*—R. Skudy
*Attorney, Agent, or Firm*—Michael J. Striker

[57] ABSTRACT

A brush holder assembly is designed so as to be prefabricated in automatic assembly machines. All the components of the assembly are located on a single side of an insulated carrier plate. The components are connected together by means of electrically conductive grommets which are fixed in the carrier plate. A vibration-resistant holder assembly is thus formed which can be assembled with less cost than other such assemblies which require hand labor.

7 Claims, 4 Drawing Figures

PREFABRICATED BRUSH HOLDER ASSEMBLY FOR USE IN SMALL ELECTRIC MOTORS

BACKGROUND OF THE INVENTION

1. Field of the Invention

This invention pertains to prefabricated brush holder assemblies which are designed to be used in electric motors. More particularly, this invention pertains to such assemblies which are so designed that they are easy to prefabricate using automatic machines.

2. Description of the Prior Art

Prefabricated brush holder assemblies have been previously disclosed. For example, such an assembly is disclosed in German Offenlegungsschrift No. 27 01 161. In the device taught in this reference, the various components of the brush holder assembly are connected together by clips in such a fashion that it is necessary to have access to both sides of an insulated carrier plate in order to prefabricate the assembly.

As a result of this construction, prefabrication of this device entails substantial manufacturing cost. Firstly, the time and effort required to prefabricate this device is extensive. Secondly, the design taught in this reference is such that it does not lend itself to manufacture by automatic machines. Thus, it would be advantageous to provide a prefabricated brush holder assembly so designed that it could be properly manufactured by an automatic machine, without the extensive costs associated with hand labor.

SUMMARY OF THE INVENTION

Thus, it is the primary object of this invention to provide a prefabricated brush holder assembly which is suitable for prefabrication on automatic machines. Other objects of this invention are to provide such a brush holder assembly which is mechanically stable even under adverse vibration conditions and which has a long service life.

These objects, along with others which will become apparent hereinafter, are achieved by utilizing an insulated carrier plate in which metal electrically conductive grommets are fixed. In this invention, the leads from the various electrical components used in the invention and from the carbon brushes with which the invention is equipped are all routed to the grommets, and can be soldered thereto. Moreover, the components of the invention are located on the same side of the carrier plate. Finally, the power leads which can be utilized in this device have ends which are shaped into the form of eyelets, in order to form grommet-like connectors which can also be soldered together.

As a result of this construction, all the components utilized in the invention can be inserted from only one side of the carrier plate, making the device well suited for automatic assembly in suitable machines. Moreover, the use of the grommets permits a high degree of mechanical stability to be achieved, lengthening service life.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
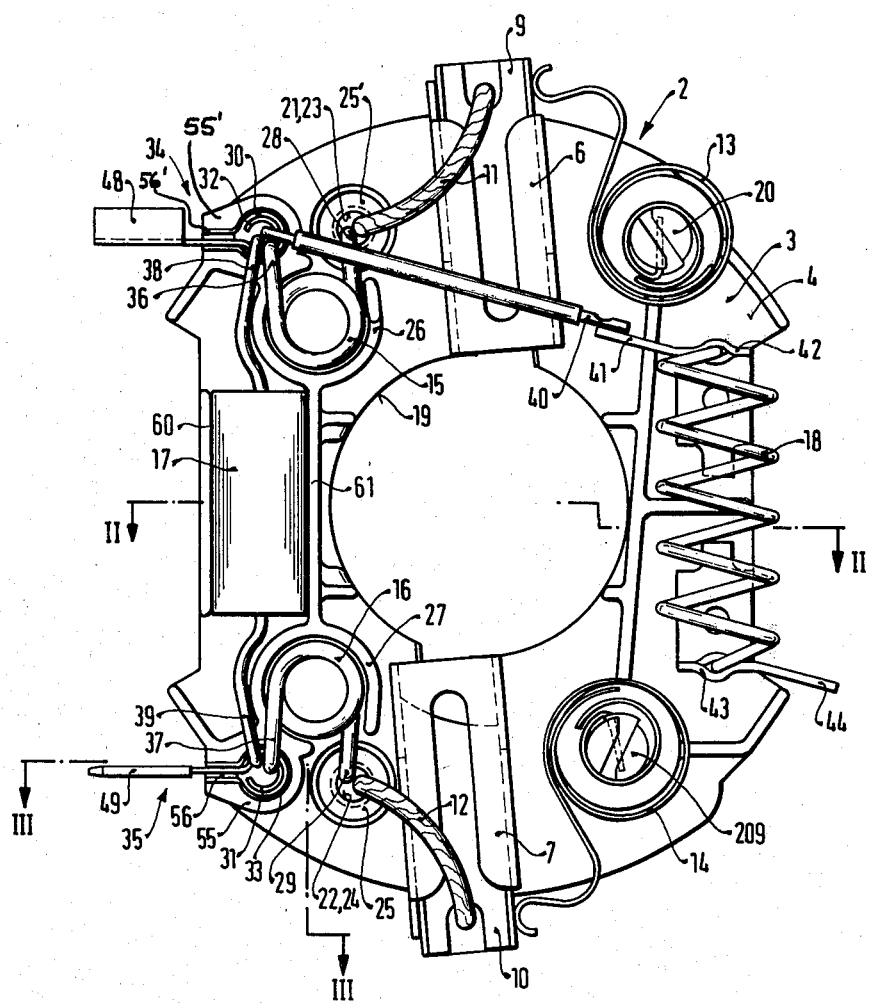
FIG. 1 is a view of the invention, as seen from the first side of the carrier plate.

A brush holder, generally indicated by reference number 2 in FIG. 1, is designed for use in small electric motors. The brush holder is constructed on and secured to a carrier plate 3 with a first side 4 and a second side 5. The second side is not visible in FIG. 1, and is better shown in FIG. 2. The carrier plate 3 is made of an insulating material such as plastic and is molded or cast in a single unitary piece.

A central generally circular opening 19 is located in the middle of the carrier plate, and is sufficiently large so as to receive a commutator of the armature of a small electric motor. Two brush carriers 6 and 7 are secured to the first side 4 of the carrier plate 3 by means of tabs 8, which extend through the carrier plate 3 to its second side 5. Tabs 8 are bent up against second side 5 so as to fix brush holders 6 and 7 to carrier plate 3.

Brush carriers 6 and 7 are identically shaped, and have hollow interiors in which carbon brushes 9 and 10 are slidably located. Carbon brush 9 is located inside brush carrier 6, whereas carbon brush 10 is located inside brush carrier 7. The radially inwardmost ends of each brush carrier 6 and 7 are diametrically opposed to each other across central opening 19, but do not extend along radii thereof. It will be noted that the radially innermost ends of carbon brushes 9 and 10 have curved surfaces that, together with the periphery of central opening 19, form a circle. This offset construction of the carbon brushes 9 and 10 is known per se, and is designed to increase service life of the brushes.

Power leads 48 and 49 are shaped into lugs which are rectangular and which are perpendicular to one another. Power lead 48 extends parallel to carrier plate 3, whereas power lead 49 extends perpendicular thereto. Raised horseshoe-shaped portions 55' and 55 are located on the first side 4 to form channels 56 and 56' in which the radially innermost ends of power leads 49 and 48 are located. These radially innermost ends 31 and 32 are shaped into the form of hooks or eyelets which extend perpendicularly to the carrier plate 3 through holes 33 and 30. Thus, it can be seen that the horseshoe-shaped regions 55 and 55' form recesses into which the power leads 49 and 48 may be introduced.

A capacitor 17 is placed between ribs 60 and 61 which are molded into the first side 4. Thus, the capacitor 17 is retained flush against side 4. The capacitor 17 has leads 38 and 39 which extend between eyelets 31 and 32 so as to be placed across power leads 48 and 49.

Rib 61, which extends perpendicularly to the first side 4, is perpendicular to the first side 4 in two opposed U-shaped regions 26 and 27. Regions 26 and 27 take the shape of open-topped cylinders having a portion of their circumferential walls cut away. A choke 15 is formed of a coil of wire which is supported within region 26 while a like choke is similarly supported within region 27. End 36 of choke 15 is electrically connected to lead 38 of capacitor 17 and to the power lead 48 at eyelet 32, whereas lead 37 of choke 16 is similarly connected to lead 39 of capacitor 17 and power lead 49 at eyelet 31.

Two grommets 25 and 25' are located in holes which extend through the carrier plate 3, adjacent regions 55 and 27 in one region of the plate 3 and adjacent regions 55' and 26 in another region of plate 3. Grommets 25 and 25' are annular in shape, and are made of an electrically-conductive metal. Brush lead 11 extends between grommet 25' and carbon brush 9, while brush lead 12 extends between grommet 25 and carbon brush 10 in a similar fashion. Finally, lead 28 of choke 15 also extends into grommet 25', while lead 29 of choke 16 extends into grommet 25.

Figure 4:
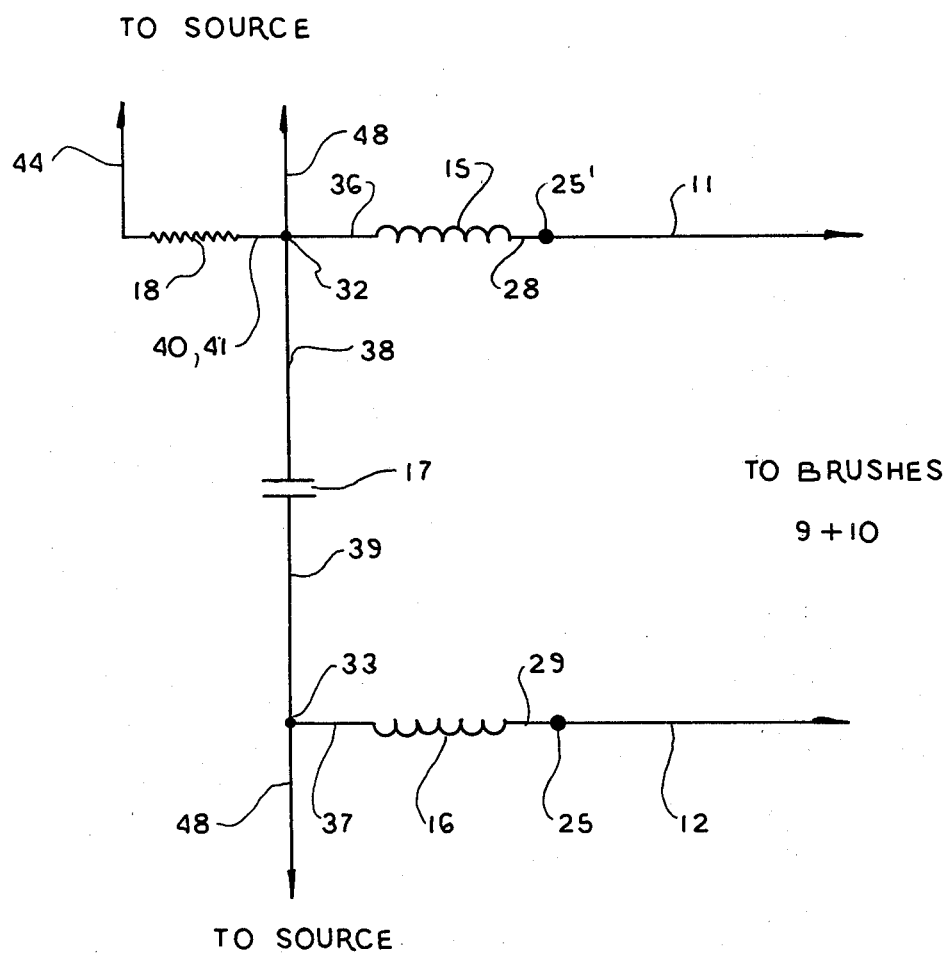
FIG. 4 is a schematic diagram of the electrical network used in the invention.

It may thus be seen that four connection points have been formed. Two of these connection points are formed by eyelets 32 and 31, while the other two are formed by grommets 25 and 25'. These four connection points may be soldered or welded so as to fix all electrical leads therein in place. It may be seen that when such soldering or welding is performed, a connection which is stable both electrically and mechanically is established between coil 15 and 16, capacitor 17, brushes 9 and 10, and power leads 48 and 49. These components all form an electrical network in which capacitor 17 is placed across power leads 48 and 49, and in which choke 15 is placed in series with brush lead 11, while choke 16 is placed in series with brush lead 12. A schematic diagram showing the electrical network thus formed in shown in FIG. 4. Choke 15 and 16 and capacitor 17 form an anti-interference network which prevents brush noise from being transmitted to power leads 48 and 49. If desired, a helical resistor 18 may be connected to the first side 4 at clasps 42 and 43 located on the first side 4. The radially innermost lead 41 of resistor 18 is connected to eyelet 32 by a wire 40 which is soldered or welded between lead 41 and eyelet 32. Lead 44 of resistor 18 thus remains internally unconnected with the rest of the components described above. Those skilled in the art will understand that a voltage can be applied across the brushes 9 and 10 by energizing lead 44 together with power lead 49, or alternatively by energizing lead 48 with lead 49. In the event that lead 44 and power lead 49 are energized, electrical current will flow through resistor 18, causing a voltage drop across resistor 18 and resulting in a decreased motor speed when the brush holder is located within an electric motor. In the event that a higher speed is desired, lead 44 may be disconnected and power may be applied directly across power leads 48 and 49.

Brush springs 13 and 14 are secured to the first side 4 at points 20 and 209 respectively. Brush springs 13 and 14 are mirror images of each other and take the form of coiled leaf springs. As shown in FIG. 1 these two leaf springs bear upon the sides of carbon brushes 9 and 10 when the brushes are not pushed fully into brush carriers 6 and 7. However, when the invention is installed in an electric motor, and a commutator (not shown) is received within central opening 19, carbon brushes 9 and 10 can be pushed radially inwardly until they abut the commutator. At this point, spring 13 will bear against the end of carbon brush 9, while spring 14 will bear against the end of the carbon brush 10. These brush springs 13 and 14 will thus urge the brushes 9 and 10 against the commutator, insuring a proper electrical connection between the commutator bars (not shown) and carbon brushes 9 and 10.

Figure 2:
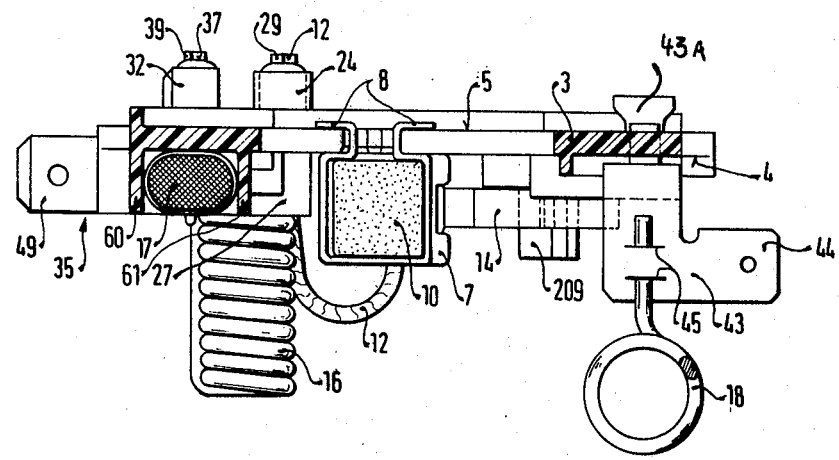
FIG. 2 is a view of the invention taken along line II—II as shown on FIG. 1.

Referring now to FIG. 2, the structure of the brush holder assembly may be seen more clearly. Each of the chokes 15 and 16 is helical and extends perpendicular to carrier plate 3. This results in a space saving so that the invention can be used in small electric motors. Lead 44 is held by a flat L-shaped plate 43, plate 43 having a prong that extends through the carrier plate 3 to the second side 5 to serve plate 43 to carrier plate 3. Resistor 18 is connected to plate 43 through a flange formed by two parallel slits 45.

Figure 3:
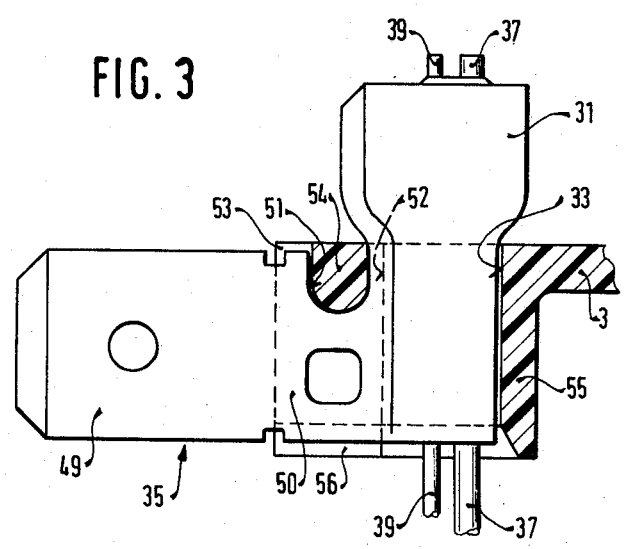
FIG. 3 is a view of the invention taken along the surface defined by line III—III shown in FIG. 1.

FIG. 3 shows the structure of the carrier plate 3 adjacent power lead 49. The structure of the carrier plate 3 adjacent power lead 48 is identical to this structure, but power lead 48 has a lug which is perpendicular to the lug on power lead 49. It can be seen that the power lead 49 is actually a unitary metal plate which is embedded in region 55 of the carrier plate 3. Web 50, which is formed as part of power lead 49, has a U-shaped recess, which is engaged by a plug 54, and which retains the power lead lead 49 to be retained in the carrier plate 3 without separating therefrom as a result of installation and removal from a suitable connection block.

The embodiment shown herein is particularly suitable for automative fuel pumps and the like. When such use is contemplated, resistor 18 is placed in the path of air which passes through the fuel pump, in order to cool resistor 18 so that no burn-out occurs. It can be seen from the above description that all the anti-interference components such as chokes 15 and 16 and capacitor 17, springs 13 and 14, resistor 18, brush holders 6 and 7, and carbon brushes 9 and 10 can all be inserted from the first side 4 of the carrier plate 3. Moreover, the same is true of power lugs 48 and 49. As a result, this device lends itself to prefabrication using automatic machinery, since it is possible to hold the carrier plate 3 fixed and to insert the various components into it. As a result of the unitary construction of carrier plate 3, the entire brush holder assembly disclosed herein has a high degree of structural integrity and resistance to vibration during use.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed as new and desired to be protected by Letters Patent is set forth in the appended claims:

1. A brush holder assembly designed for prefabrication by an automatic machine and further designed to be used with commutators of small electric motors used in fuel pumps and the like, comprising: a carrier plate manufactured of an insulating material, the carrier plate having a central opening with a periphery, the opening being so sized that a commutator of a small electric motor can be received therein and further having a first side and a second side; two hollow brush carriers fixed on the first side of the carrier plate so as to abut the periphery of the opening at opposed points; two carbon brushes, each located within a corresponding one of the brush carriers and slidably movable therewithin so as to be abuttable against a commutator received within the opening; two brush springs fixed on the first side of the carrier plate and cooperating with the brushes in a manner that each brush spring can urge a corresponding one of the brushes against a commutator received within the opening; to brush leads, each attached to a corresponding one of the brushes; anti-interference components located on and having lead ends bent toward the first side of the carrier plate; two power leads each having an end shaped into an eyelet form, which ends are fixed in the first side of the carrier plate and are electrically connected to at least one of the anti-interference components; and a plurality of electrically conductive grommets fixed in the carrier plate and electrically connecting the brush leads, the power leads and the lead ends of the anti-interference components into an electrical network.

2. The assembly defined in claim 1, further including a resistor fixed to the first side of the carrier plate and having an end electrically connected to one of the power leads.

3. The assembly defined in claim 1, wherein the grommets and leads are soldered together.

4. The assembly defined in claim 1, wherein the ends of the power leads are located in recesses molded into the carrier plate, which recesses pass through the carrier plate.

5. The assembly defined in claim 1, wherein the anti-interference components include two chokes and a capacitor, and wherein the network is structured in a manner that the capacitor is connected across the power leads and each choke is in series with a corresponding one of the brush leads.

6. The assembly defined in claim 1, wherein each brush spring is a coiled leaf spring.

7. The assembly defined in claim 5, wherein each choke is elongated and extends perpendicularly from the first side.

* * * * *